(12) United States Patent  
Nakai et al.

(10) Patent No.: US 7,675,637 B2  
(45) Date of Patent: Mar. 9, 2010

(54) PRINTING SYSTEM, PRINTING METHOD, PRINTING APPARATUS AND OUTPUT APPARATUS

(75) Inventors: Yasuhiro Nakai, Soraku-gun (JP); Masao Saeda, Yamatokoriyama (JP); Haruo Kawauchi, Yamatokoriyama (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1308 days.

(21) Appl. No.: 11/150,725

(22) Filed: Jun. 9, 2005

(65) Prior Publication Data

US 2005/0278190 A1  Dec. 15, 2005

(30) Foreign Application Priority Data

Jun. 9, 2004 (JP) ............................ P2004-171213  
Jun. 9, 2004 (JP) ............................ P2004-171214

(51) Int. Cl.  
*G06F 15/00* (2006.01)  
*G06K 1/00* (2006.01)

(52) U.S. Cl. ...................... 358/1.14; 358/1.15; 358/1.1; 358/1.9

(58) Field of Classification Search ....... 358/1.13–1.18, 358/1.9, 1.1

See application file for complete search history.

(56) References Cited

U.S. PATENT DOCUMENTS

| 7,002,707 | B2 * | 2/2006 | Kujirai ........................ 358/1.9 |
| 2002/0131059 | A1 * | 9/2002 | Tsuchitoi ..................... 358/1.1 |
| 2003/0151768 | A1 * | 8/2003 | Iida ........................... 358/1.15 |

FOREIGN PATENT DOCUMENTS

JP  62-003322  1/1987

* cited by examiner

*Primary Examiner*—Chan S Park  
*Assistant Examiner*—Satwant K Singh  
(74) *Attorney, Agent, or Firm*—Edwards Angell Palmer & Dodge LLP; David G. Conlin; David A. Tucker

(57) ABSTRACT

A CPU of a printing apparatus stores print data that is output from an output apparatus in a storage portion, and waits for the print switch on an operation panel to be operated before printing. If the print data pertaining to printing is administrative-use print data for which the output result is to be provided to a store clerk only once, then the CPU deletes the print data from the storage portion after printing. If the print data pertaining to printing is service-use print data for which the output result is to be repeatedly provided to customers, then the CPU continuously stores the print data in the storage portion after printing.

12 Claims, 9 Drawing Sheets

TB1

| 2004. 2.21 | 10:32 | 1001 | NEW PROJECT | STORE MANAGER |
|---|---|---|---|---|
| 2004. 2.21 | 12:03 | 1002 | NEW PRODUCT OF THE MONTH | STORE CLERK A |
| 2004. 2.21 | 14:12 | 1003 | LUNCH MENU FOR NEXT MONTH | STORE CLERK A |
| 2004. 2.21 | 14:32 | 1004 | INVENTORY LIST | STORE CLERK C |
| 2004. 2.21 | 15:03 | 1005 | CAMPAIGN | SALES REP G |
| | | | | |

| 2004. 1.31 | 10:07 | 0001 | INFORMATION NAME: a | 10 pages | ¥100 |
|---|---|---|---|---|---|
| 2004. 2. 7 | 17:32 | 0002 | INFORMATION NAME: A | 1 page | ¥10 |
| 2004. 2. 9 | 19:57 | 0003 | INFORMATION NAME: C | 3 pages | ¥150 |
| 2004. 2.28 | 7:58 | 0004 | INFORMATION NAME: D | 7 pages | ¥350 |
| | | | | | |

FIG. 3B

| | | | | | | TB3 |
|---|---|---|---|---|---|---|
| 2004. 2.21 | 10:32 | 1001 | NEW PROJECT | STORE MANAGER | STORE | |
| 2004. 2.21 | 12:03 | 1002 | NEW PRODUCT OF THE MONTH | STORE CLERK A | DELETE | |
| 2004. 2.21 | 14:12 | 1003 | LUNCH MENU FOR NEXT MONTH | STORE CLERK A | DELETE | |
| 2004. 2.21 | 14:32 | 1004 | INVENTORY LIST | STORE CLERK C | DELETE | |
| 2004. 2.21 | 15:03 | 1005 | CAMPAIGN | SALES REP G | STORE | |
| | | | | | | |

FIG. 7A

| | | | | | | TB4 |
|---|---|---|---|---|---|---|
| 2004. 1.31 | 10:07 | 0001 | INFORMATION NAME: a | 10 pages | ¥100 | |
| 2004. 2. 7 | 17:32 | 0002 | INFORMATION NAME: A | 1 page | ¥10 | |
| 2004. 2. 9 | 19:57 | 0003 | INFORMATION NAME: C | 3 pages | ¥150 | |
| 2004. 2.28 | 7:58 | 0004 | INFORMATION NAME: D | 7 pages | ¥350 | |
| | | | | | | |

FIG. 7B

PRINTING SYSTEM, PRINTING METHOD, PRINTING APPARATUS AND OUTPUT APPARATUS

CROSS REFERENCE

This Nonprovisional application claims priority under 35 U.S.C. § 119(a) on Patent Application Nos. 2004-171213 and 2004-171214, both filed in Japan on Jun. 9, 2004, the entire contents of which are hereby incorporated by reference.

BACKGROUND OF THE INVENTION

The present invention relates to a printing system that is installed in, for example, a store in a state in which it is ready to be used by a plurality of users and that includes an output apparatus constituted by a personal computer or the like and a printing apparatus constituted by a digital copier or the like, as well as to a printing method performed in such a printing system, and a printing apparatus and an output apparatus that are included in the printing system.

A printing apparatus such as a digital copier may be installed in a store in a state in which it is ready to be used by a plurality of users. This printing apparatus outputs a printing medium that has been subjected to printing based on print data, not only for customers of the store, but also for a store manager or a store clerk.

When the store manager or the store clerk uses the printing apparatus installed in the store, there may be cases where the print data should not be disclosed to the public. In such cases, it is required that no customer is present near the printing apparatus. On the other hand, when the customers of the store use the printing apparatus, a plurality of the customers may request output of a single piece of information, so that it is necessary that the same print data can be repeatedly subjected to printing.

Therefore, as disclosed in JP S62-003322A, there are some conventional printing apparatuses that perform so-called "hold processing" by which print data that has been input from an external output apparatus is held in a storage portion together with unique authentication information, without being subjected to printing, and when the authentication information is input, the print data corresponding to the input authentication information is read from the storage portion and printed on a printing medium.

In addition, the print data to be provided to the customers of the store may include paid-for print data. In this case, the printing apparatus stores, in the storage portion, the amount to be paid for the print data as additional information, together with the authentication information and the print data, and waits for input of the authentication information and completion of billing before reading the corresponding print data from the storage portion.

In general, for print data that is subjected to the hold processing and thus is printed on a printing medium after input of the authentication information, the optimum holding state varies depending on the type of the print data.

However, none of the conventional printing apparatuses have performed the hold processing in a manner that allows the print data to be held in different states depending on the type of the print data.

For example, print data that is to be provided to a specific user (the store manager or the store clerk) often needs to be deleted from the storage portion after it has been printed on a printing medium, whereas print data that is to be provided to a non-specific user (the customer of the store) needs to be stored in the storage portion even after it has been printed on a printing medium. Furthermore, print data that is to be provided to a non-specific user may need to be revised with respect to its content or its additional information after it has been once stored in the storage portion.

It is an object of the present invention to provide a printing system, a printing method, a printing apparatus and an output apparatus that are capable of holding various print data in an optimum state in accordance with the types of the print data.

SUMMARY OF THE INVENTION

The present invention includes:

an output apparatus that outputs print data together with type information and authentication information that are input in an output apparatus side input portion; and a printing apparatus that reads the print data corresponding to authentication information that is input in a printing apparatus side input portion from a storage portion to supply a printing portion, while selectively performing a new hold mode process of storing the print data and the authentication information in a new area in the storage portion or an update hold mode process of overwriting print data in the storage portion that corresponds to the same authentication information with the print data that is input from the output apparatus together with the authentication information, based on the type information input from the output apparatus.

BRIEF DESCRIPTION OF THE DRAWINGS

FIGS. 3A and 3B are diagrams showing how print data is stored in a digital copier serving as a printing apparatus of the printing system according to the first embodiment.

FIGS. 7A and 7B are diagrams showing how print data is stored in a digital copier serving as a printing apparatus of the printing system according to the second embodiment.

DESCRIPTION OF THE PREFERRED EMBODIMENTS

Figure 1:
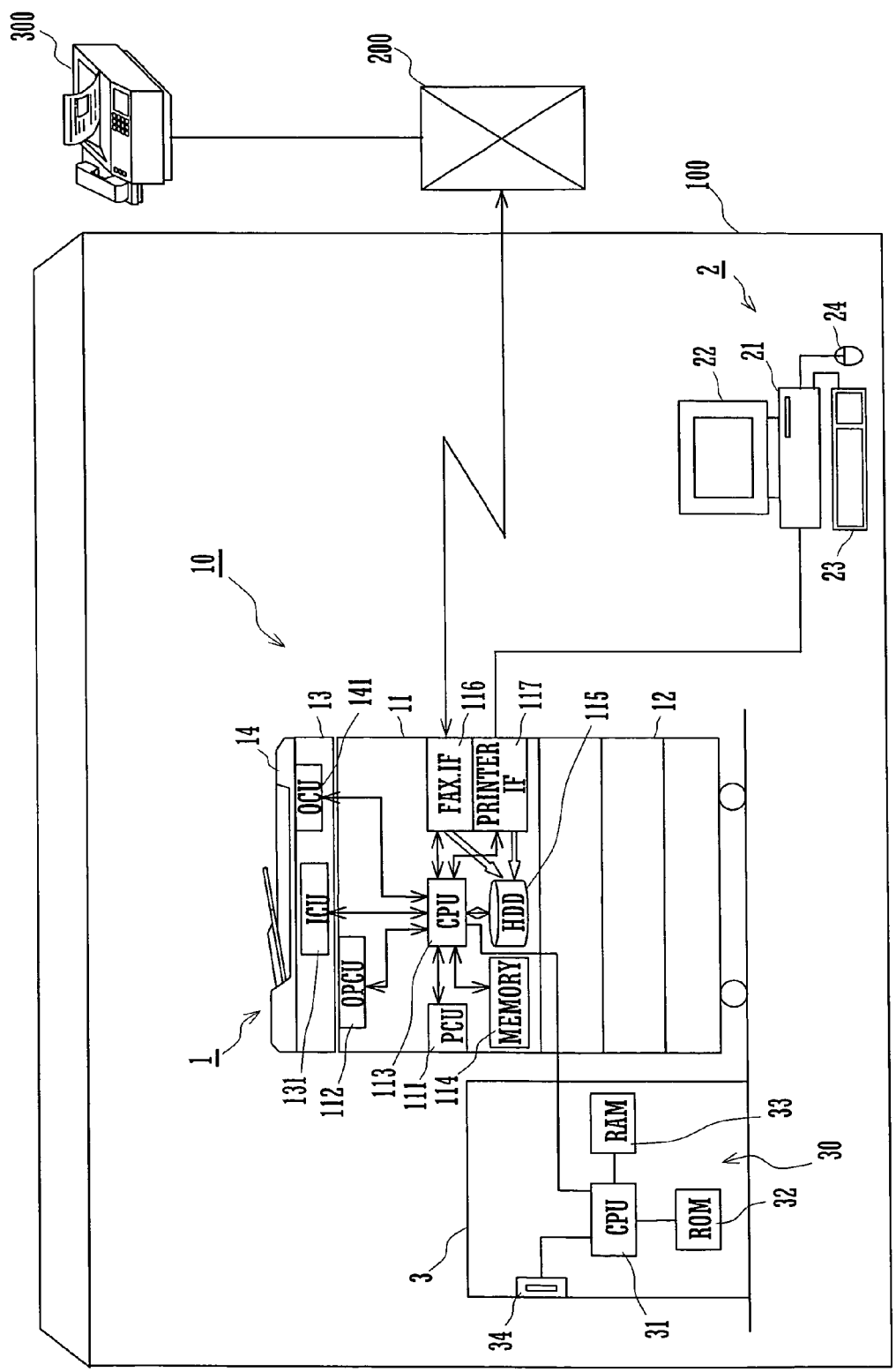
FIG. 1 is a diagram showing a configuration of a printing system according to a first embodiment of the present invention.

FIG. 1 is a diagram showing a configuration of a printing system 10 according to a first embodiment of the present invention. The printing system 10 is installed in a store 100. The printing system 10 is configured by connecting, to a digital copier 1 serving as the printing apparatus of the present invention, a personal computer (hereinafter, referred to as "PC") 2 and a money processing device 3.

The digital copier 1 is used for copying, facsimile transmission processing and the process of providing image information for a customer, as well as for printing performed by a store clerk. In copying, an image that has been read from an original brought in by a customer is printed on a printing medium such as paper. In the facsimile transmission processing, image information of an original brought in by a customer is transmitted via a public telephone network 200 to a facsimile device 300 that has been designated by the customer. During providing image information, an image is printed on a printing medium, based on print data that the customer has specified from among service-use print data stored in advance. In the printing, an image is printed on a printing medium, based on print data that the store clerk has specified from among administrative-use print data stored in advance.

The copying, the facsimile transmission processing, and the process of providing image information that are performed to a customer are carried out based on billing in the money processing device 3. More specifically, prior to execution of the processes, the money processing device 3 receives cash or a charge card (e.g., a credit card or prepaid card) that is inserted by the customer, and transmits monetary information, such as the amount of cash that has been inserted or the credit limit of the card, to the digital copier 1.

The digital copier 1 stores previously determined unit price information for the copying, the facsimile transmission processing and the process of providing image information. Based on the unit price information, the digital copier 1 performs operations relating to the copying, the facsimile transmission processing and the process of providing image information, without exceeding the limit of the monetary information transmitted from the money processing device 3.

The service-use print data pertaining to the process of providing image information and the administrative-use print data that relates to printing have been transmitted in advance from the PC 2. The distinctions of service use or administrative use correspond to the types of print data according to the present invention. Furthermore, the service-use print data is print data that is to be provided to a non-specific output target (the customer) according to the present invention, whereas the administrative-use print data is print data that is to be provided to a specific output target (the store clerk) according to the present invention.

The PC 2 adds at least type information and authentication information to the print data, and transmits the print data to the digital copier 1. The type information is information for identifying whether the print data is to be provided to customers or is for in-house use. The authentication information is information for identifying each print data set, and is, for example, a four-digit code number. The customer or the store clerk inputs his or her own authentication information to the digital copier 1, and then selects the desired print data.

The digital copier 1 serving as the printing apparatus is made up of a printing portion 11, a paper-feed portion 12 and an image reading portion 13. The printing portion 11 prints an image on a printing medium by, for example, an electrophotographic image forming operation. The paper-feed portion 12 houses the printing medium that is to be supplied to the printing portion 11. The image reading portion 13 reads an image of an original that has been placed manually on an original platen (not shown), or an original that has been carried onto the original platen by an automatic document feeder 14. In addition, the automatic document feeder 14 is disposed on the original platen of the image reading portion 13 so as to be opened and closed for exposing and covering the original platen.

The printing portion 11 and the paper-feed portion 12 are controlled by a process control unit (hereinafter, referred to as "PCU") 111. The image reading portion 13 is controlled by an image control unit (hereinafter, referred to as "ICU") 131. The automatic document feeder 14 is controlled by an original control unit (hereinafter, referred to as "OCU") 141.

Further, the digital copier 1 is provided with an operation panel (not shown) that includes key switches and a display. This operation panel is controlled by an operation panel control unit (hereinafter, referred to as "OPCU") 112. The key switches of the operation panel and the OPCU 112 correspond to the printing apparatus side input portion according to the present invention.

The PCU 111, the ICU 131, the OCU 141 and the OPCU 112 are all controlled by a central processing unit (hereinafter, referred to as "CPU") 113. The CPU 113 is connected to a memory 114 made up of a ROM and a RAM, a hard disk 115 serving as the storage portion of the present invention, a facsimile interface 116 for performing communication with the facsimile device 300 via the public telephone network 200, and a printer interface 117 connected to the PC 2.

The PC 2 serving as the output apparatus of the present invention is provided with a main unit 21, a display 22, a keyboard 23 and a mouse 24. The keyboard 23 and the mouse 24 correspond to the output apparatus side input portion according to the present invention. The PC 2 reads print data from a recording medium such as a CD-ROM or a memory card, and receives operations performed by a piece of application software installed in the PC to create and edit the print data. The read-in print data or the print data that has been created or edited is stored in the main unit 21, and then output to the digital copier 1.

The money processing device 3 is provided with a control portion 30 that is constituted by a CPU 31 that includes a ROM 32 and a RAM 33. The CPU 31 calculates the amount of, for example, coins inserted in a slot 34, and outputs the amount as monetary data to the digital copier 1.

The CPU 113 of the digital copier 1 temporarily stores the print data that has been input from the PC 2 in the hard disk 115 using a hold function, instead of printing the data immediately. The CPU 113 then reads, from the hard disk 115, the print data that has been selected by operating a predetermined key switch on the operation panel to supply the PCU 111, and performs the printing in the printing portion 11.

Figure 2:
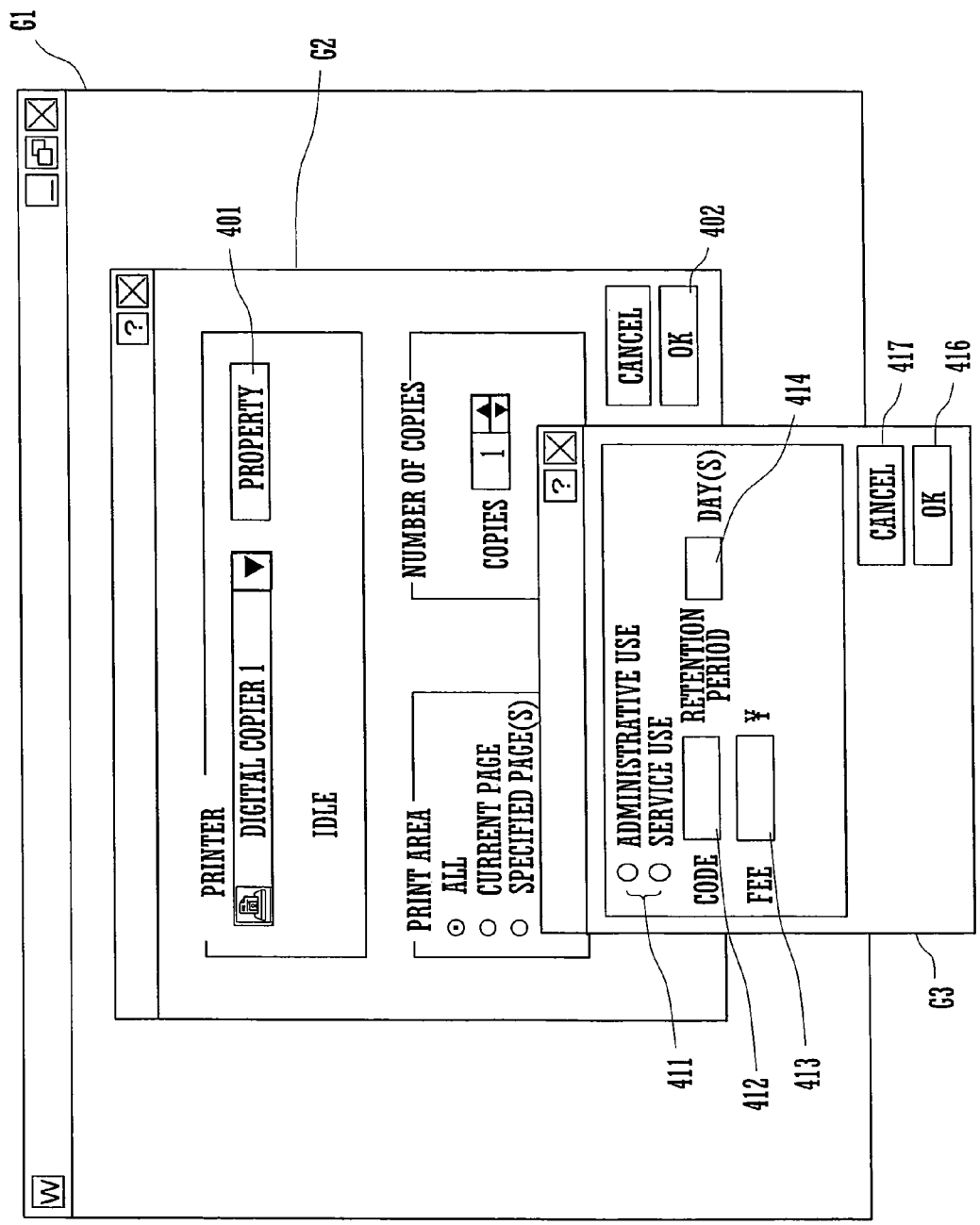
FIG. 2 is a diagram showing an example of display windows of a PC serving as an output apparatus of the printing system according to the first embodiment while outputting image data.

FIG. 2 is a diagram showing an example of display windows of the PC 2 serving as the output apparatus of the printing system 10 described above while outputting image data. When image data for which the reading, creating or editing operation has been completed in the PC 2 is output to the digital copier 1, if a command to perform the printing is given in the currently executed application software, then a print setting window G2 is displayed over a display window G1 of the currently executed application software on the display 22.

If a property button 401 is clicked while the digital copier 1 is selected on the print setting window G2 as the printer for printing, then a driver software for the digital copier 1 that is installed in the PC 2 displays a detailed setting window G3 for the digital copier 1, over the windows G1 and G2.

The detailed setting window G3 displays input portions 411 to 414 for inputting type information, authentication information, billing information and retention information of print data, respectively, as well as an OK button 416, and a Cancel button 417.

The authentication information input portion 411 receives the selection of whether the print data that is to be output is administrative-use print data or service-use print data. The authentication information input portion 412 receives input of code data serving as the authentication information for identifying the print data that is to be output. This authentication information may be automatically added by the driver software. The billing information input portion 413 receives input of the amount of the fee to be collected from the customer for the service-use print data. The retention information input portion 414 receives input of the period for which the service-use print data is to be retained on the hard disk 115.

It should be noted that the billing information input portion 413 and the retention information input portion 414 are not essential. The unit price of the service-use print data and the retention period of the service-use print data may be set to default values, thereby omitting input of the whole or a portion of the billing information and the retention information for each print data set. The OK button 416 and the Cancel button 417 will be described later.

When the OK button 416 is clicked after the whole or a portion of the type information, the authentication information, the billing information and the retention information of the print data is input on the detailed setting window G3, the driver software of the digital copier 1 adds this information to the print data being displayed on the display window G1, and then closes the detailed setting window G3. Subsequently, when the OK button 402 is clicked on the print setting window G2, the driver software of the digital copier 1 outputs the print data to which the predetermined information has been added to the digital copier 1.

Thus, by receiving input of information, such as the type information, on the detailed setting window G3 displayed by the driver software of the digital copier 1, it is possible to readily add information, such as the type information, to the print data that is to be output from the PC 2 to the digital copier 1, regardless of the type of the application software that is used during operation of reading, creating or editing images in the PC 2.

It is also possible to install, in the PC 2 in advance, a piece of application software that is dedicated to the digital copier 1 for reading, creating or editing images, and to receive input of information, such as the type information, on the print setting window of that piece of application software.

FIGS. 3A and 3B show how print data is stored in the digital copier 1 serving as the printing apparatus of the printing system 10 described above. The hard disk 115 includes an administrative-use print data table TB1 and a service-use print data table TB2 shown in FIGS. 3A and 3B, which are separate from the area for storing print data. The CPU 113 classifies print data that has been input from the PC 2 into administrative-use print data and service-use print data by referring to the respective type information, and stores the authentication information, the billing information and the retention information that are added to each set of the classified data into either the table TB1 or TB2.

The administrative-use print data table TB1 is made up of the following entries: the time and date of input, the code number (authentication information), the file name, and the name of file creator that relate to each set of administrative-use print data. The service-use print data table TB2 is made up of the following entries: the time and date of input, the code number (authentication information), the file name, the number of pages and the unit price (billing information) that relate to each set of service-use print data. It should be noted that each of the file name, the name of file creator and the number of pages is information that is commonly added to print data.

The entries constituting the tables TB1 and TB2 are not limited to the examples shown in FIGS. 3A and 3B, as long as they include at least the authentication information. For example, the entries constituting the service-use print data table may include the retention information.

The tables TB1 and TB2 are displayed on the display that is included on the operation panel of the digital copier 1. That is, when the store clerk or the customer operates a predetermined key switch included on the operation panel of the digital copier 1, and thereby selects the print data that is stored in the digital copier 1 by a holding function to be output, the CPU 113 supplies the content of the table TB1 or TB2 to the OPCU 112, and the OPCU 112 displays the content of the table TB1 or TB2 on the display included on the operation panel.

While displaying the content of the table TB1 or TB2 on the display, the OPCU 112 receives an operation performed by the store clerk or the customer selecting a single print data set. This selection is performed, for example, by operating the key switches included on the operation panel to input the authentication information. In this case, it is sufficient that at least the authentication information is displayed on the display, and not all the entries constituting the tables TB1 and TB2 need to be displayed.

It is also possible to dispose a touch panel on the display so as to-allow the store clerk or the customer to select the print data that he or she wishes to output by pressing the touch panel based on the file name displayed on the display. In this case, although at least the file name needs to be displayed on the display, the code number serving as the authentication information need not be displayed.

Figure 4:
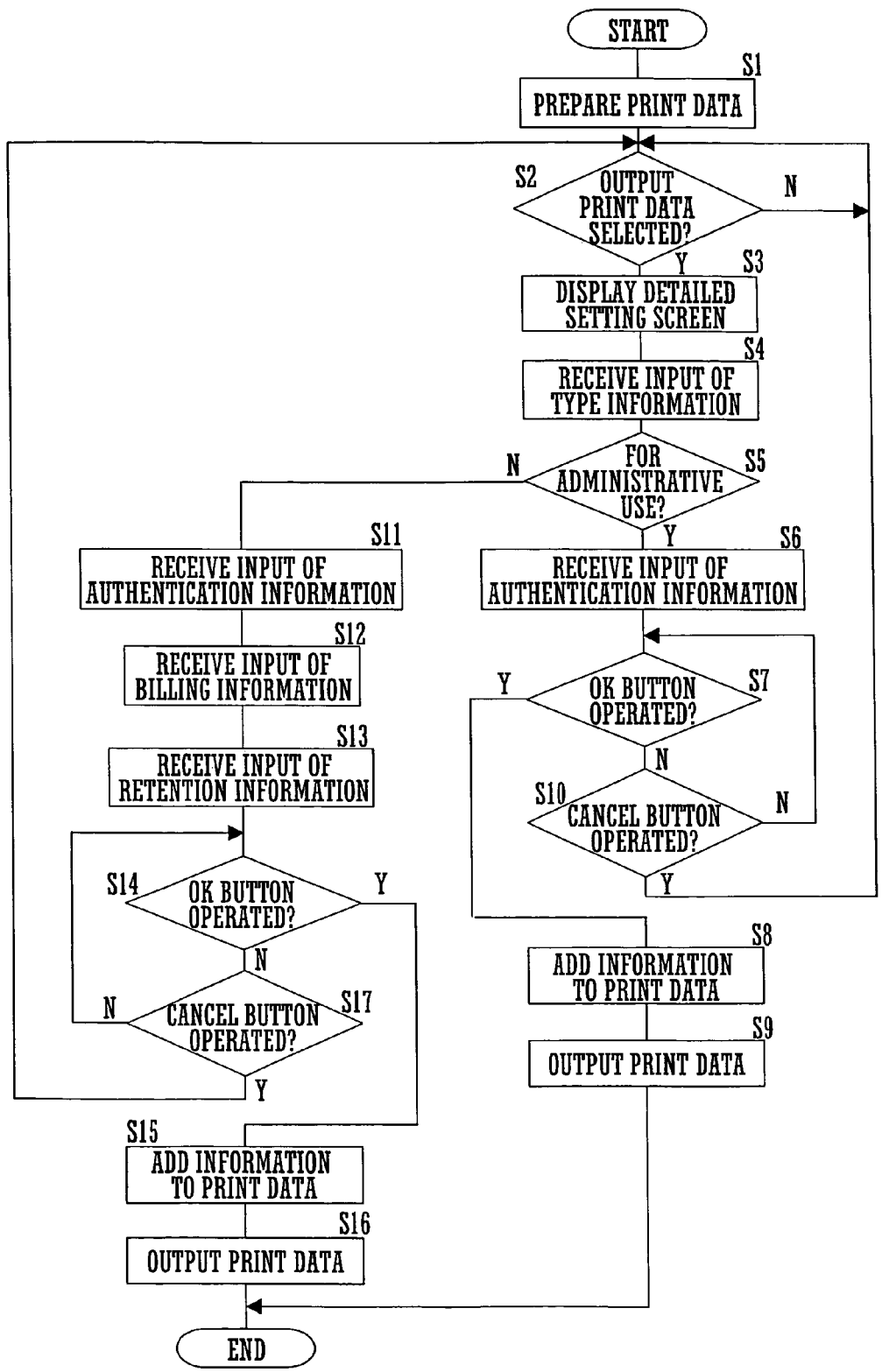
FIG. 4 is a flowchart showing a processing procedure in the PC of the printing system according to the first embodiment.
Figure 5:
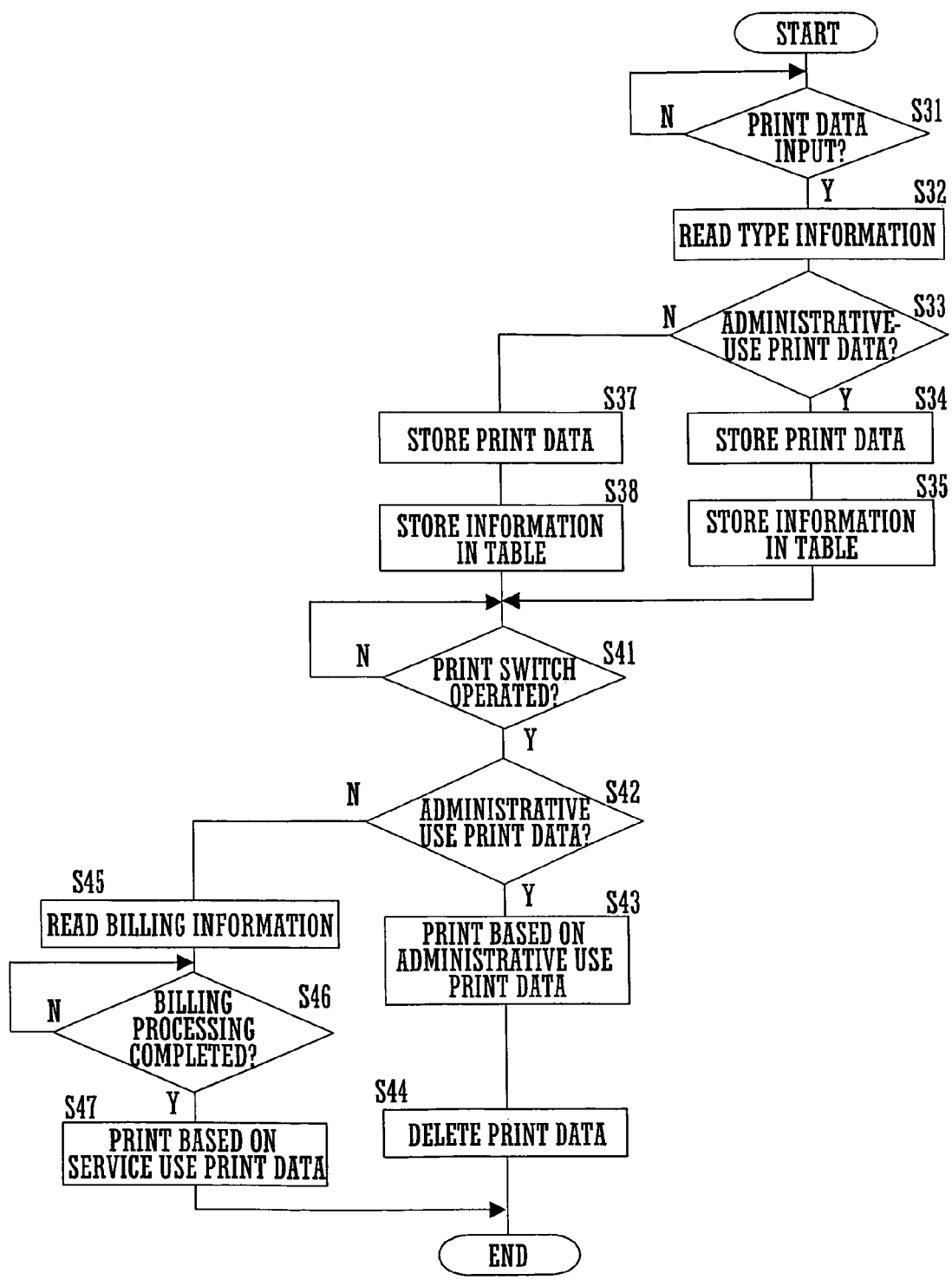
FIG. 5 is a flowchart showing a processing procedure in the digital copier of the printing system according to the first embodiment.

FIGS. 4 and 5 are flowcharts illustrating the printing method in the above-described printing system 10 according to the present invention. FIG. 4 shows the processing procedure in the PC 2 that constitutes the printing system 10, and FIG. 5 shows the processing procedure in the digital copier 1 of the printing system 10. When preparation of the print data is completed in the PC 2 by the reading, creating or editing operation (S1), and output of the print data by the digital copier 1 is selected (S2), the PC 2 displays the detailed setting window G3, shown in FIG. 2, on the display 22, and receives input of the information that is to be added to the print data (S3). At this time, only the Cancel button 417 and the type information input portion 411 are enabled on the detailed setting window G3, and the PC 2 receives input of the type information first (S4).

If the type information that is received indicates that the print data is administrative-use print data, then the PC 2 enables the authentication information input portion 412, and receives input of the authentication information (S5, S6). As described above, the code number serving as the authentication information may be automatically assigned by the PC 2, thereby omitting the processing of S6.

Once the authentication information has been received, the PC 2 waits for the OK button 416 to be clicked before adding the type information and the authentication information to the print data, and then outputs the print data to the digital copier 1 (S7, S8, S9). If the Cancel button 417 is operated, then the PC 2 clears the type information input portion 411 and the authentication information input portion 412, and the procedure returns to S2 (S10 to S2).

If the type information that is received indicates that the print data is service-use print data, then the PC 2 enables the authentication information input portion 412, the billing information input portion 413 and the retention information input portion 414, and receives input of the authentication information, the billing information and the retention information (S5 to S11, S12, S13). As described above, the code number serving as the authentication information may be automatically assigned by the PC 2, and the billing information indicating the unit price of the service-use print data and the retention information for determining when the print data is to be deleted after the printing may be set to default values, thereby omitting the processing of S11 through S13.

Once the authentication information, the billing information and the retention information have been received, the PC 2 waits for the OK button 416 to be clicked before adding the type information, the authentication information, the billing information and the retention information to the print data, and then outputs the print data to the digital copier 1 (S14, S15, S16). If the Cancel button 417 is operated, then the PC 2 clears the type information input portion 411, the authentication information input portion 412, the billing information input portion 413 and the retention information input portion 414, and the procedure returns to S2 (S17 to S2).

Upon receiving input of the print data from the PC 2, the CPU 113 of the digital copier 1 reads the type information added to the print data (S31, S32). If the input print data is administrative-use print data, then the CPU 113 stores the print data, together with at least the authentication information, in a new area within the area for storing print data in the hard disk 115 (S33, S34). Furthermore, the CPU 113 stores the information added to the input print data in the administrative-use print data table TB1 (S35).

If the input print data is service-use print data, then the CPU 113 stores the print data, together with at least the authentication information, in a new area within the area for storing print data in the hard disk 115 (S37). Further, the CPU 113 stores the information added to the input print data in the service-use print data table TB2 (S38).

A store clerk or a customer who wishes to output the print data stored in the digital copier 1 inputs the type information and the authentication information on the operation panel, and operates a print switch. When the print switch included on the operation panel is operated, the CPU 113 determines which one of the administrative-use print data and the service-use print data is selected (S41, S42).

In addition, when the authentication information for identifying the service-use print data that the customer wishes to output is a code number, it is possible to inform the customer of the correlation between the service-use print data and the code number, for example, by posting the correlation near the digital copier 1, or displaying it on a large display included with the digital copier 1.

If the administrative-use print data is selected, then the CPU 113 reads the print data that matches the input authentication information from the hard disk 115 to supply the PCU 111, and prints out based on the print data (S43). Upon completion of this printing, the CPU 113 deletes the print data from the hard disk 115 (S44). At this time, the CPU 113 also deletes the corresponding data from the administrative-use print data table TB1.

If the service-use print data is selected, then the CPU 113 reads the billing information added to print data that matches the input authentication information (S45), waits for completion of billing performed based on the monetary information transmitted from the money processing device 3 before reading the print data that matches the input authentication information from the hard disk 115 to supply the PCU 111, and prints out based on the print data (S46, S47).

If there is no print data that matches the input authentication information present in the hard disk 115, then the CPU 113 displays a message on the display included on the operation panel to the effect that there is no print data.

Additionally, during standby for the processing operations, the CPU 113 refers to the retention information in the service-use print data table TB2 at predetermined time intervals, and deletes from the hard disk 115 any service-use print data whose time has come to be deleted.

As described above, in the printing system 10, the process of deleting or continuously storing the print data from or onto the hard disk 115 after printing, is selectively performed according to the type of the print data pertaining to the printing, that is, depending on whether the print data is administrative-use print data for which the output result is to be provided only at a single occasion for the store clerk, who is a specific output target, or service-use print data for which the output result is to be repeatedly provided to the customers, who are non-specific output targets. Accordingly, print data can be stored in the digital copier 1 in an optimum state in accordance with the type of the print data.

Figure 6:
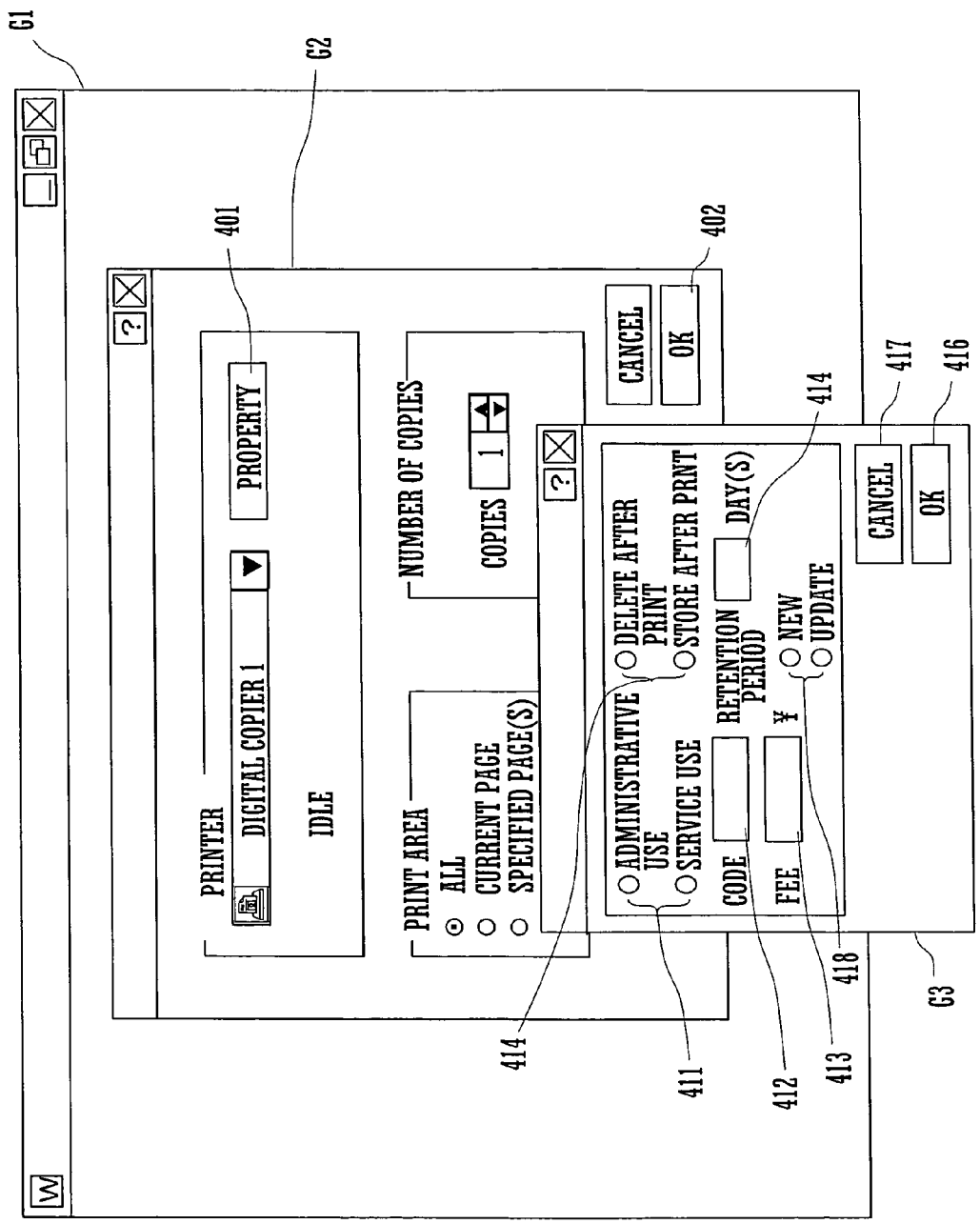
FIG. 6 is a diagram showing an example of display windows of a PC serving as an output apparatus of a printing system according to a second embodiment of the present invention while outputting image data.

FIG. 6 is a diagram showing an example of display windows of a PC serving as the output apparatus of a printing system 10 according to a second embodiment of the present invention while outputting image data. It should be noted that the printing system 10 of the second embodiment has the same configuration as the printing system 10 of the first embodiment shown in FIG. 1, except that the digital copier 1 and the program installed in the PC 2 are different from those in the printing system 10 of the first embodiment shown in FIG. 1. Therefore, the processing operations of the digital copier 1, part of the display windows on the display 22 of the PC 2, and part of the processing operations of the PC 2 are different from those in the printing system 10 of the first embodiment shown in FIG. 1.

When image data for which the reading, creating, or editing operation has been completed in the PC 2 of the printing system 10 according to the second embodiment is output to the digital copier 1, if a command to perform the printing is provided in the currently executed application software, then the print setting window G2 is displayed over the display window G1 of the currently executed application software on the display 22.

If a property button 401 is clicked while the digital copier 1 is selected on the print setting window G2 as the printer for printing, then a driver software for the digital copier 1 that is installed in the PC 2 displays a detailed setting window G4 for the digital copier 1, over the windows G1 and G2.

The detailed setting window G4 displays input portions 411 to 415 for inputting type information, authentication information, additional information, deletion information and retention information, respectively, of print data, as well as the OK button 416, the Cancel button 417 and a mode selection input portion 418.

The authentication information input portion 411 receives the selection of whether the print data that is to be output is administrative-use print data or service-use print data. The authentication information input portion 412 receives input of code data serving as the authentication information for identifying the print data that is to be output. This authentication information may be automatically added by the driver software. The additional information input portion 413 receives input of the amount of the fee to be collected from the customer for the service-use print data. The deletion information input portion 414 receives the selection of whether to store or to delete the print data in or from the hard disk 115 after the printing, for the administrative-use print data. The retention information input portion 415 receives input of the period for which the service-use print data is to be stored in the hard disk 115.

It should be noted that the input portions 413 to 415 for inputting the additional information, the deletion information and the retention information, respectively, of print data are not essential. The unit price of the service-use print data, whether to delete the administrative-use print data after the printing, and the retention period of the service-use print data may be set to default values, thereby omitting input of the whole or a portion of the additional information, the deletion information and the retention information for each print data set.

The OK button 416, the Cancel button 417 and the mode selection input portion 418 will be described later.

When the OK button 416 is clicked after the whole or a portion of the type information, the authentication information, the additional information, the deletion information and the retention information of the print data is input on the detailed setting window G4, the driver software of the digital copier 1 adds this information to the print data being displayed on the display window G1, and then closes the detailed setting window G4. Subsequently, when the OK button 402 is clicked on the print setting window G2, the driver software of the digital copier 1 outputs the print data to which the predetermined information has been added to the digital copier 1.

Thus, by receiving input of information, such as the type information, on the detailed setting screen G4 displayed by the driver software of the digital copier 1, it is possible to readily add information, such as the type information, to the print data that is to be output from the PC 2 to the digital copier 1, regardless of the type of the application software that is used during operation of reading, creating or editing images in the PC 2.

It is also possible to install, in the PC 2 in advance, a piece of application software that is dedicated to the digital copier 1 for reading, creating or editing images, and to receive input of information, such as the type information, on the print setting screen of that piece of application software.

FIGS. 7A and 7B show how print data is stored in the digital copier 1 serving as the printing apparatus of the printing system 10 according to the second embodiment. The hard disk 115 includes an administrative-use print data table TB3 and a service-use print data table TB4 shown in FIGS. 7A and 7B, which are separate from the area for storing print data. The CPU 113 classifies print data that has been input from the PC 2 into administrative-use print data and service-use print data, based on the respective type information, and stores the authentication information, the additional information, the deletion information and the retention information that are added to each set of the classified data into either the table TB3 or TB4.

The administrative-use print data table TB3 is made up of the following entries: the time and date of input, the code number (authentication information), the file name, the name of file creator and the deletion information that relate to each set of administrative-use print data. The service-use print data table TB4 is made up of the following entries: the date of input, the code number (authentication information), the file name, the number of pages and the unit price (additional information) that relate to each set of service-use print data. It should be noted that each of the file name, the name of file creator and the number of pages is information that is commonly added to print data.

The entries constituting the tables TB3 and TB4 are not limited to the examples shown in FIGS. 7A and 7B, as long as they include at least the authentication information. For example, the entries constituting the service-use print data table may include the retention information.

The tables TB3 and TB4 are displayed on the display that is included on the operation panel of the digital copier 1. That is, when the store clerk or the customer operates a predetermined key switch included on the operation panel of the digital copier 1, and thereby selects the print data that is stored in the digital copier 1 by a holding function to be output, the CPU 113 supplies the content of the table TB3 or TB4 to the OPCU 112, and the OPCU 112 displays the content of the table TB3 or TB4 on the display included on the operation panel.

While displaying the content of the table TB3 or TB4 on the display included on the operation panel, the OPCU 112 receives an operation performed by the store clerk or the customer selecting a single print data set. This selection is performed, for example, by input of the authentication information by operating the key switches included on the operation panel. In this case, it is sufficient that at least the authentication information is displayed on the display included on the operation panel, and not all the entries constituting the tables TB3 and TB4 need to be displayed.

It is also possible to dispose a touch panel on the display included on the operation panel so as to allow the store clerk or the customer to select the print data that he or she wishes to output by pressing the touch panel based on the file name displayed on the display included on the operation panel. In this case, although at least the file name needs to be displayed on the display included on the operation panel, the code number serving as the authentication information need not be displayed.

Figure 8:
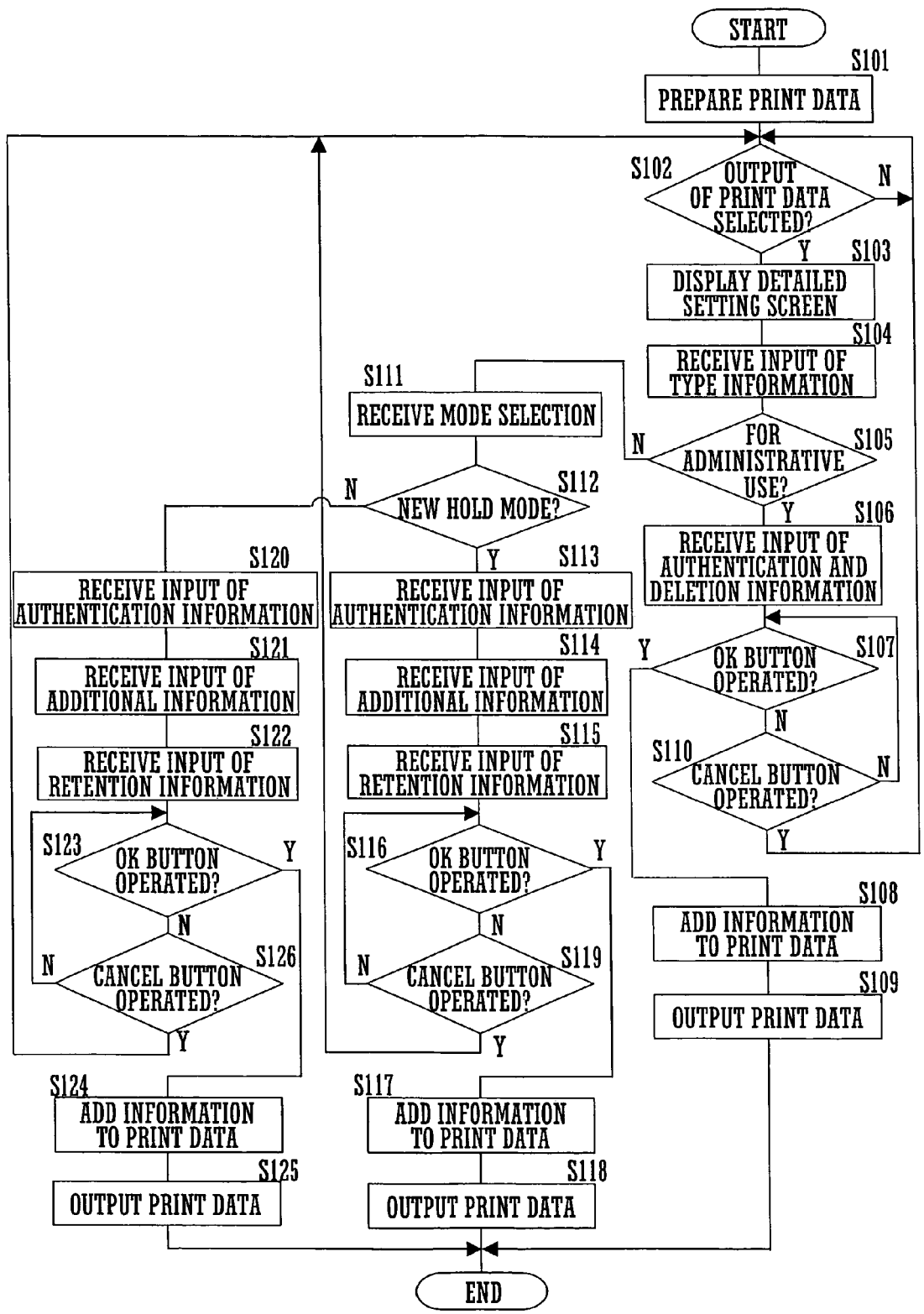
FIG. 8 is a flowchart showing a processing procedure in the PC of the printing system according to the second embodiment.
Figure 9:
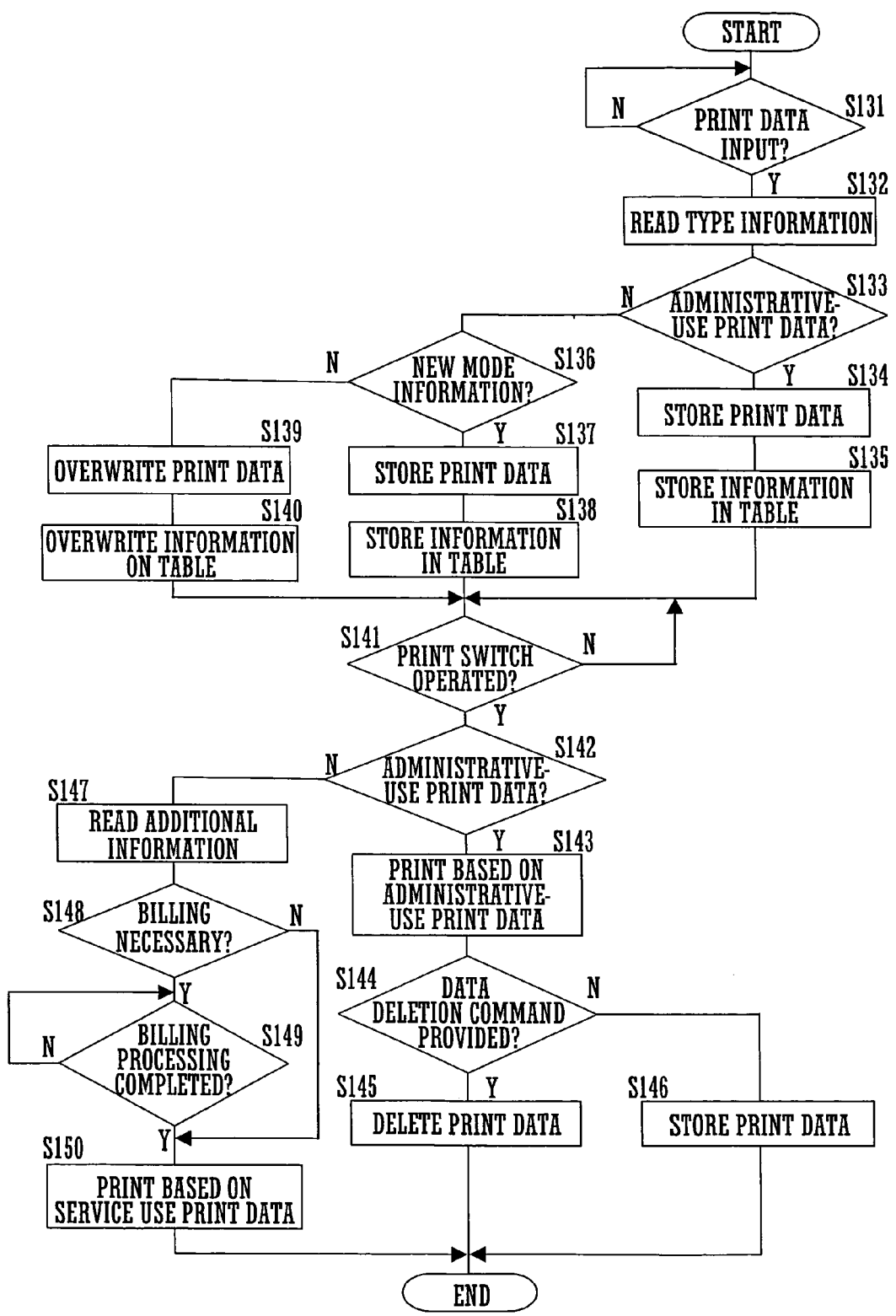
FIG. 9 is a flowchart showing a processing procedure in the digital copier of the printing system according to the second embodiment.

FIGS. 8 and 9 are flowcharts illustrating the printing method of the printing system 10 according to the second embodiment. FIG. 8 shows the processing procedure in the PC 2 that constitutes the printing system 10, and FIG. 9 shows the processing procedure in the digital copier 1 of the same printing system 10. When preparation of the print data is completed in the PC 2 by the reading, creating or editing operation (S101), and output of the print data by the digital copier 1 is selected (S102), the PC 2 displays the detailed setting window G4, shown in FIG. 6, on the display 22, and receives input of the information that is to be added to the print data (S103). At this time, only the Cancel button 417 and the type information input portion 411 are enabled on the detailed setting window G4, and the PC 2 receives input of the type information first (S104).

If the type information that is received indicates that the print data is administrative-use print data, then the PC 2 enables the authentication information input portion 412 and the deletion information input portion 414, and receives input of the authentication information and the deletion information (S105 to S106). As described above, the code number serving as the authentication information maybe automatically assigned by the PC 2, and the deletion information indicating whether to delete or to store the print data after the printing may be set to a default value, thereby omitting the processing of S106.

Once-the authentication information and the deletion information have been received, the PC 2 waits for the OK button 416 to be clicked, adds the type information, the authentication information, and the deletion information to the print data, and then outputs the print data to the digital copier 1 (S107, S108, S109). If the Cancel button 417 is operated, then the PC 2 clears the type information input portion 411, the authentication information input portion 412 and the deletion information input portion 414, and the procedure returns to S102 (S110 to S102).

If the type information that is received indicates that the print data is service-use print data, then the PC 2 receives a mode selection between a new hold mode process or an update hold mode process, in the mode selection input portion 418 (S111). The new hold mode process is a process of writing the service-use print data onto the hard disk 115 as new print data. The update hold mode process is a process of overwriting the print data that is already stored in the hard disk 115 with the service-use print data that is to be output the present time.

The update hold mode process is performed, for example, when the service content is changed in accordance with the state of customer utilization, after specific service-use print data is stored in the digital copier 1 for provision to the customer. The service-use print data that is updated in the update hold mode process includes not only print data itself, but also the additional information, which is the unit price of the print data. Therefore, the update hold mode process is also performed in the case where the unit price is reduced when the degree of customer utilization is low.

Additionally, since the process of deleting print data from the hard disk 115 after the printing is usually selected as the deletion information for the administrative-use print data, only a process similar to the new hold mode process is performed.

If the new hold mode process is selected in S111, then the PC 2 enables the authentication information input portion 412, the additional information input portion 413 and the retention information input portion 415, and receives input of the authentication information, the additional information and the retention information (S112, S113, S114, S115). As described above, the code number serving as the authentication information may be automatically assigned by the PC 2, and the retention information for determining when the print data is to be deleted after the printing may be set to a default value, thereby omitting the processing of S113 and S115.

Once the authentication information, the additional information and the retention information have been input, the PC 2 waits for the OK button 416 to be clicked, adds new mode information, as well as the type information, the authentication information, the additional information and the retention information, to the print data, and then outputs the print data to the digital copier 1 (S116, S117, S118) If the Cancel button 417 is operated, then the PC 2 clears the type information input portion 411, the authentication information input portion 412, the additional information input portion 413 and the retention information input portion 415, and the procedure returns to S102 (S119 to S102).

If the update hold mode process is selected in S111, then the PC 2 enables the authentication information input portion 412, the additional information input portion 413 and the retention information input portion 415, and receives input of the authentication information, the additional information and the retention information (S112, S120, S121, S122). As described above, the code number serving as the authentication information may be automatically assigned by the PC 2, and the retention information for determining when the print data is to be deleted after the printing may be set to a default value, thereby omitting the processing of S120 and S122.

Once the authentication information, the additional information and the retention information have been received, the PC 2 waits for the OK button 416 to be clicked, adds update mode information, as well as the type information, the authentication information, the additional information and the retention information, to the print data, and then outputs the print data to the digital copier 1 (S123, S124, S125). If the Cancel button 417 is operated, then the PC 2 clears the type information input portion 411, the authentication information input portion 412, the additional information input portion 413 and the retention information input portion 415, and the procedure returns to S102 (S126 to S102).

Upon receiving input of the print data from the PC 2, the CPU 113 of the digital copier 1 reads the type information added to the print data (S131, S132). If the input print data is administrative-use print data, then the CPU 113 stores the print data, together with at least the authentication information, in a new area within the area for storing print data in the hard disk 115 (S133, S134). Furthermore, the CPU 113 stores the information added to the input print data in the administrative-use print data table TB3 (S135).

If the input printing data is service-use print data, then the CPU 113 determines which one of the new mode information and the update mode information is added to the print data (S136) If the new mode information is added, then the CPU 113 stores the printing data, together with at least the authentication information, in a new area within the area for storing printing data in the hard disk 115 (S137). Further, the CPU 113 stores the information added to the input print data in the service-use print data table TB4 (S138).

If the update mode information is added, then the CPU 113 overwrites the currently input print data on the area storing a print data set that is included in the print data stored in the hard disk 115 and to which authentication information identical to the authentication information added to the currently input printing data is added (S139). Further, the CPU 113 overwrites, with the information added to the input print data, information that is included in the service-use print data table TB4 and to which the same authentication information is added (S140).

A store clerk or a customer who wishes to output the print data stored in the digital copier 1 inputs the type information and the authentication information on the operation panel, and operates a print switch. When the print switch included on the operation panel is operated, the CPU 113 determines which one of the administrative-use print data and the service-use print data is selected (S141, S142).

In addition, when the authentication information for identifying the service-use print data that the customer wishes to output is a code number, it is possible to inform the customer of the correlation between the service-use print data and the code number, for example, by posting the correlation near the digital copier 1, or displaying it on a large display included with the digital copier 1.

If the administrative-use print data is selected, then the CPU 113 reads print data that matches the input authentication information from the hard disk 115 to supply the PCU 111, and prints out based on the print data (S143). Upon completion of this printing, the CPU 113 determines the content of the deletion information added to the print data (S144), and deletes or stores the print data from or in the hard disk 115 in accordance with the content of the deletion information (S145, S146). In the case of deleting the printing data from the hard disk 115, the CPU 113 also deletes the corresponding data from the administrative-use print data table TB3.

If the service-use print data is selected, then the CPU 113 reads the additional information added to print data that matches the input authentication information (S147), and determines whether billing is necessary (S148). If billing is necessary, then the CPU 113 waits for completion of billing performed based on the monetary information transmitted from the money processing device 3 before reading the print data that matches the input authentication information from the hard disk 115 to supply the PCU 111, and prints out based on the print data (S149, S150).

If there is no print data that matches the input authentication information is present in the hard disk 115, then the CPU 113 displays a message on the display included on the operation panel to the effect that there is no print data.

Additionally, during standby for the processing operations, the CPU 113 refers to the retention information in the service-use print data table TB4 at predetermined time intervals, and deletes from the hard disk 115 any service-use print data whose time has come to be deleted.

As described above, in the printing system 10, print data itself and information added to the print data can be changed by the update hold mode process, for print data that has been temporarily stored in the hard disk 115. Accordingly, it is possible, for example, to readily change the service content in accordance with the state of customer utilization, for example, after storing specific service-use print data in the digital copier 1 for provision to the customer. Consequently, it is possible to increase the number of modes of operation of the digital copier 1 installed in the store, thus providing improved services to the customers.

Finally, the embodiments described above are to be considered in all respects as illustrative and not limiting. The scope of the invention is indicated by the appended claims rather than by the foregoing embodiments. Furthermore, all changes which come within the meaning and range of equivalency of the claims are intended to be embraced in the scope of the invention.

What is claimed is:

1. A printing system comprising:

an output apparatus comprising an output apparatus side input portion for receiving input of type information for identifying a type of print data and authentication information for identifying the print data, wherein the output apparatus outputs the print data together with the type information and the authentication information that are input in the output apparatus side input portion; and a printing apparatus comprising a storage portion for storing the print data input from the output apparatus, together with the authentication information, a printing apparatus side input portion for receiving input of the authentication information and a printing portion for printing onto a printing medium based on the print data, wherein the printing apparatus reads the print data corresponding to the authentication information that is input in the printing apparatus side input portion from the storage portion to supply the printing portion, while selectively performing a new hold mode process of storing the print data and the authentication information in a new area in the storage portion or an update hold mode process of overwriting print data in the storage portion that corresponds to the same authentication information with the print data that is input from the output apparatus together with the authentication information, based on the type information input from the output apparatus, wherein the type information is information for identifying whether print data is print data that is to be provided to a specific output target or print data that is to be provided to a non-specific output target, and wherein the printing apparatus performs the update hold mode process only for print data that is to be provided to a non-specific output target, based on the type information.

2. The printing system according to claim 1, wherein the output apparatus further receives, in the output apparatus side input portion, input of additional information pertaining to printing of the print data, and outputs the print data together with the type information, the authentication information and the additional information, and wherein the printing apparatus stores the print data together with the authentication information and the additional information in the storage portion, and overwrites, during the update hold mode process, the print data or the additional information that is included in the storage portion and to which the same authentication information is added with print data or additional information that is input from an external apparatus together with the authentication information.

3. The printing system according to claim 1, wherein the output apparatus further receives, in the output apparatus side input portion, deletion information indicating whether to delete the print data pertaining to the new hold mode process after printing, and outputs the print data together with the type information, the authentication information and the deletion information, and wherein, after supplying the print data stored in the storage portion by the new hold mode process to the printing portion, the printing apparatus selectively deletes the print data together with the authentication information from the storage portion, based on the type information and the deletion information that are input from the output apparatus.

4. The printing system according to claim 1, wherein the output apparatus further receives, in the output apparatus side input portion, input of retention information for identifying a period for which the print data is to be retained, and outputs the print data together with the type information, the authentication information and the retention information, and wherein, after the retention period identified by the retention information has elapsed, the printing apparatus deletes the print data stored in the storage portion from the storage portion, together with the authentication information and the additional information.

5. A printing method, comprising outputting, by an output apparatus, type information for identifying a type of print data and authentication information for identifying the print data that are input in an output apparatus side input portion, together with the print data, to a printing apparatus; and selectively performing, by a printing apparatus, a new hold mode process of storing the print data and the authentication information in a new area in a storage portion or an update hold mode process of overwriting print data in the storage portion that corresponds to the same authentication information with the print data that is input together with the authentication information from the output apparatus, based on the type information input from the output apparatus, and, when authentication information is input in a printing apparatus side input portion, reading, by the printing apparatus, the print data corresponding to said authentication information from the storage portion to supply a printing portion, wherein the type information is information for identifying whether print data is print data that is to be provided to a specific output target or print data that is to be provided to a non-specific output target, and wherein the printing apparatus performs the update hold mode process only for print data that is to be provided to a non-specific output target, based on the type information.

6. The printing method according to claim 5, wherein the output apparatus further receives in the output apparatus side input portion, input of additional information pertaining to printing of the print data, and outputs the print data together with the type information, the authentication information and the additional information, and wherein the printing apparatus stores the additional information together with the output data and the authentication information in the storage portion, and overwrites, during the update hold mode process, the print data or the additional information in the storage portion that corresponds to the same authentication information with print data or additional information that is input from an external apparatus together with authentication information.

7. The printing method according to claim 5, wherein the output apparatus further receives, in the output apparatus side input portion, deletion information indicating whether to delete the print data pertaining to the new hold mode process after printing, and outputs the print data together with the type information, the authentication information and the deletion information, and wherein, after supplying the print data stored in the storage portion by the new hold mode process to the printing portion, the printing apparatus selectively deletes the print data together with the authentication information from the storage portion, based on the type information and the deletion information that are input from the output apparatus.

8. The printing method according to claim 5, wherein the output apparatus further receives, in the output apparatus side input portion, input of retention information for identifying a period for which the print data is to be retained, and outputs the print data together with the type information, the authentication information and the retention information, and wherein, after the retention period identified by the retention information has elapsed, the printing apparatus deletes the print data stored in the storage portion from the storage portion, together with the authentication information and the additional information.

9. A printing apparatus comprising:

a storage portion for storing print data that is input from an external output apparatus, together with authentication information;

a printing apparatus side input portion for receiving input of the authentication information; and a printing portion for printing onto a printing medium based on the print data, wherein said printing apparatus:

reads print data corresponding to the authentication information input in the printing apparatus side input portion from the storage portion to supply the printing portion, while selectively performing, based on the type information and the authentication information that are input from the output apparatus together with the print data, a new hold mode process of storing the print data and the authentication information in a new area in the storage portion or an update hold mode process of overwriting print data that is included in the storage portion and to which the same authentication information is added with the print data input from the output apparatus together with the authentication information, wherein the type information is information for identifying whether print data is print data that is to be provided to a specific output target or print data that is to be provided to a non-specific output target, and wherein the printing apparatus performs the update hold mode process only for print data that is to be provided to a non-specific output target, based on the type information.

10. The printing apparatus according to claim 9, wherein the printing apparatus stores additional information together with the print data and the authentication information that are input from the output apparatus in the storage portion, and overwrites, during the update hold mode process, the print data or the additional information in the storage portion that corresponds to the same authentication information with print data or additional information that is input from an external apparatus together with authentication information.

11. The printing apparatus according to claim 9, wherein, after supplying the print data stored in the storage portion by the new hold mode process to the printing portion, the printing apparatus selectively deletes the print data together with the authentication information from the storage portion, based on deletion information indicating whether to delete the print data that is input from the output apparatus and that relates to the new hold mode process after printing.

12. The printing apparatus according to claim 9, wherein input of retention information is further received, and the retention information is stored together with the print data and the authentication information, and wherein, based on the retention information for identifying a period for which the print data that is input from the output apparatus is to be retained, the printing apparatus deletes the print data stored in the storage portion from the storage portion together with the authentication information and the additional information, after the retention period has elapsed.

* * * * *